Patented May 4, 1926.

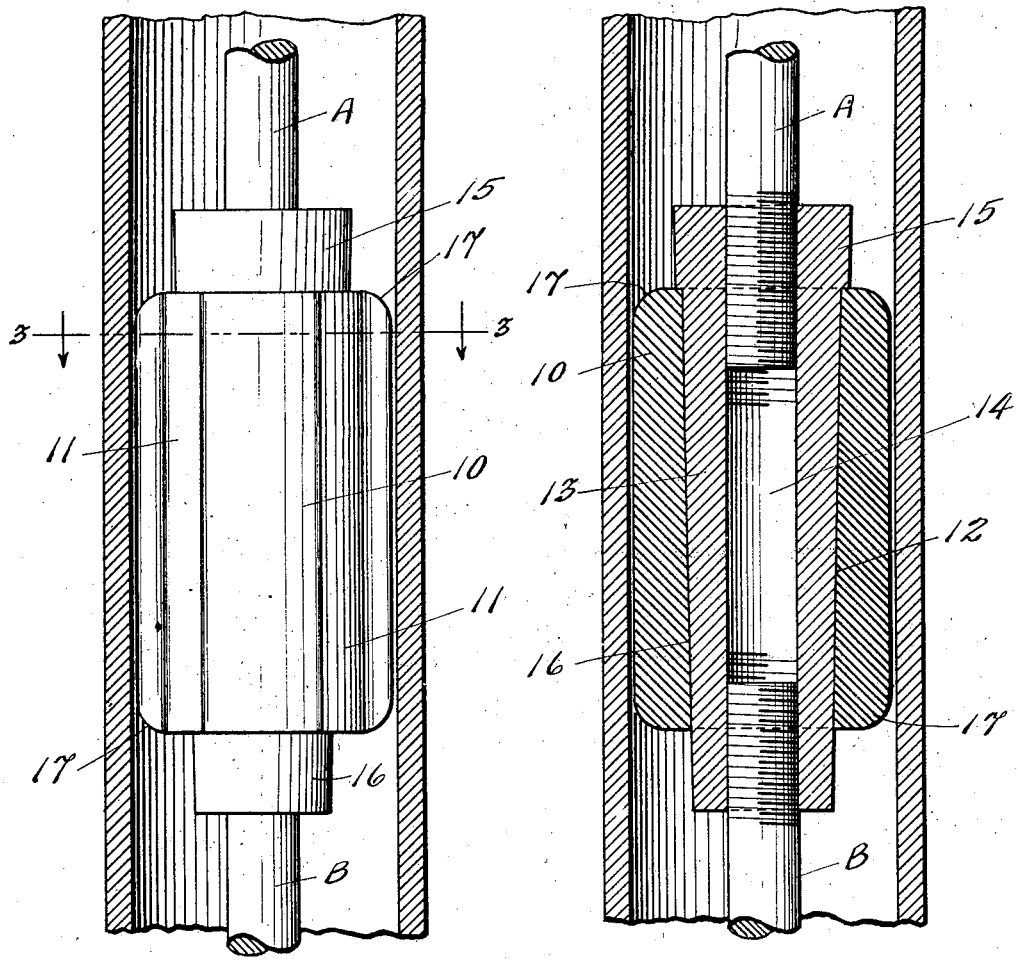
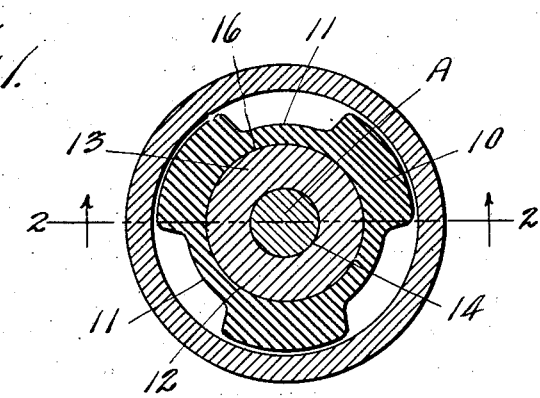

1,583,262

UNITED STATES PATENT OFFICE.

WILLIAM C. SMITH, OF CORSICANA, TEXAS.

SUCKER-ROD GUIDE.

Application filed September 12, 1925. Serial No. 55,965.

*To all whom it may concern:*

Be it known that I, WILLIAM C. SMITH, subject of Great Britain, residing at Corsicana, in the county of Navarro and State of Texas, have invented certain new and useful Improvements in Sucker-Rod Guides, of which the following is a specification.

This invention relates to new and useful improvements in sucker rod guides.

The object of the invention is to provide certain improvements in the type of guide shown in my co-pending application Ser. No. 103.

A particular object of the invention is to provide a guide comprising a bushing which is easily replaceable when worn.

Another object is to mount the bushing on the sucker rod coupling thus utilizing said coupling as a support and fastening for the bushing.

A further object is to form the coupling with an annular shoulder for taking upward thrust of the bushing and to taper the coupling downwardly from the shoulder so that the bushing may be frictionally engaged thereon.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is an elevation of a sucker rod equipped with a guide constructed in accordance with my invention, the tubing being shown in section, Fig. 2 is a vertical sectional view taken on the line 2—2 of Fig. 3, and Fig. 3 is a cross-sectional view taken on the line 3—3 of Fig. 1.

In the drawings the numeral 10 designates an elongated cylindrical bushing, which is preferably but not necessarily made of bronze or other non-corrosive metal. The bushing has a diameter greater than that of the sucker rod coupling on which it is used. Equally spaced channels or flutes 11 are provided in the outer surface of the bushing and extend longitudinally thereof, providing suitable passages for the flow of liquid.

The bushing has a downwardly tapered axial bore 12 circular in cross-section. An elongated sucker rod coupling 13 has an axial bore 14 internally screw threaded at its ends to receive the sucker rod sections A and B in the usual manner. At its upper end the coupling has an outwardly directed annular shoulder 15 which overhangs a downwardly tapered shank 16. The pitch of the shank is such as to cause the bushing to frictionally engage thereon when said bushing is driven up to the shoulder.

This manner of fastening the bushing is very effective and is more simple and economical than the wedges employed in my co-pending application. The ends 17 of the bushing may be rounded so as not to catch on obstacles in the tubing. While it is necessary to reduce the thickness of the coupling to receive the bushing, the structure when complete is very substantial and compact. When it is desired to replace the bushing it is merely necessary to drive off the old one and drive on the new one. The bushing has an ample projection beyond the face of the shoulder 15 and of course should be replaced before it wears to the said shoulder.

Various changes in the size and shape of the different parts as well as modifications and alterations may be made within the scope of the appended claims.

What I claim is:

1. In a sucker rod guide, a cylindrical external bushing having a tapered axial bore, a rod coupling having a tapered external portion engaging frictionally in the bore of the bushing, and an integral shoulder on the coupling against which one end of the bushing is seated.

2. In a sucker rod guide, a rod coupling having an integral annular shoulder at one end and a reduced shank tapering from the shoulder toward the opposite end of the coupling, and an externally fluted bushing having a tapered bore fitting on the shank of the coupling and engaging the shoulder.

3. In a sucker rod guide, a cylindrical externally fluted bushing having a tapered bore extending therethrough, a rod coupling having a tapered shank frictionally engaging in the bore of the bushing, and stationary means on the coupling and integral therewith engaged by the bushing for taking the upward thrust of the bushing.

In testimony whereof I affix my signature.

WILLIAM C. SMITH.